Inventor
OTTO K. ANNA

United States Patent Office 3,464,110
Patented Sept. 2, 1969

3,464,110
SYSTEM FOR RETAINING THE HAIR DUST IN AN ELECTRIC SHAVER CUTTING HEAD WITH AN ELECTRICAL FIELD
Otto Konrad Anna, Niederhochstadt, Taunus, Germany, assignor to Braun Aktiengesellschaft, Frankfurt am Main, Germany
Filed Oct. 31, 1966, Ser. No. 590,858
Claims priority, application Germany, Nov. 17, 1965, B 84,531
Int. Cl. B26b *19/02, 19/38*
U.S. Cl. 30—41                              4 Claims

ABSTRACT OF THE DISCLOSURE

Disclosed is an electric shaver with an electric field system for retaining hair dust. The electric field may be generated by piezoelectric means or a voltage multiplier circuit.

---

This invention relates to a dry shaving device such as an electric shaver provided with means for retaining hair dust therein.

In summary, the device of this invention is an electric shaver with a metallic cutting head, a cutting blade means mounted therein, first and second spaced apart electrodes in the cutting head, and means connected with the electrodes for producing a high D.C. voltage therebetween. The high D.C. voltage can be produced from a A.C. current obtained from a secondary motor winding through a cascade multiplier circuit or an interrupter circuit. Alternatively, the high D.C. voltage can be derived from a piezoelectric means mounted for periodic abutment with a portion of the shaver.

In dry shaving devices such as electric shavers, provision of electrical fields in the cutting head by means of an intermittently electrostatically charged plate of the like have been disclosed. The hair dust accumulating during the shaving procedure is collected on the charged plate by the effect of the electrical field and is retained thereon. However, an electrical field produced in this manner is relatively weak, so that the distance of effective field strength is not large enough.

In accordance with the invention, these shortcomings are avoided by providing the electric dry shaving apparatus with means for producing a high direct current voltage. The voltage is applied to two electrodes provided within the cutting head in the manner of a condenser or capacitor when the device is turned on.

By means of such an arrangement, it is possible to build up a sufficiently strong electrical field between the electrodes. The field becomes effective only upon actuation of the shaving device and remains constant for the entire duration of the shaving operation without being weakened.

The above-mentioned device of this invention can be constructed in various ways.

The device of this invention will be more easily understood from the drawings, wherein.

According to a first embodiment of the invention, an additional winding is provided on the winding of the electric motor power source, and the alternating voltage derived therefrom is applied, in the form of D.C. voltage, to the two electrodes by way of a conventional multiplier circuit of capacitors and rectifiers, that is, a cascade connection.

According to a modification of this embodiment of the invention, a high voltage pulse is produced from the voltage generated in the additional winding, by means of a conventional set up transformer and interrupter means such a vibrating interrupter or vibrator, which high voltage pulse is applied to the electrodes. The interruption of the circuit can be effected by moving the drive means or the cutting parts of the cutting head past a mechanical contact, by a contact-less circuit such as a photocell, or an inductive circuit.

Advantageously, the metallic cutting head is the ground electrode. The opposite electrode is a plate which is insulated with respect to the cutting head and is mounted within the cutting head in a readily detachable manner, so that it can be removed and cleaned. The hair dust accumulates on this plate.

In a second embodiment of the invention, a piezoelectrical crystal produces the D.C. voltage, this crystal being periodically subjected to mechanical forces by the moving parts of the shaver, in a direct or indirect manner.

For an electric shaver with reciprocating blade block, the arrangement can be such that a quartz platelet is provided on one front surface of the blade block, which platelet periodically hits a cam fastened to the frame of the cutting head, thus producing electrical voltage pulses which are fed to the electrodes.

Figure 1:
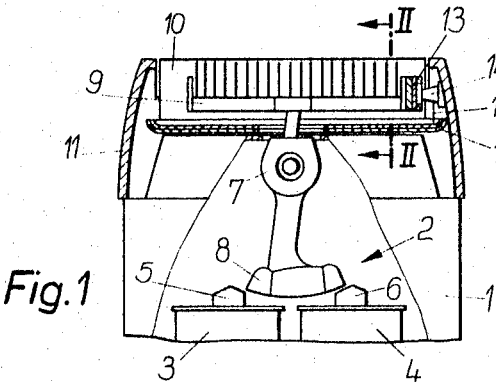
FIG. 1 is a partial section of a frontal view of one embodiment of this invention comprising a piezoelectric means.

Referring to the drawings, FIG. 1 shows the principal parts of an electrical dry shaver, A housing 1 of insulating material encases an oscillating armature motor 2, there being shown the stator windings 3 and 4, the pole shoes 5 and 6 of the laminated iron core, and the oscillating armature 8 mounted on a pivotable lever 7. A blade block is attached to the upper end of the oscillating armature 8. The blade block 9 is set into a reciprocating motion by the motor 2 and cooperates with a perforated cutting foil or plate 10 which, in turn, is mounted on a metallic cutting head frame 11 attached to the housing 1. An approximately trough-shaped plate 12 of metal or a synthetic plastic material, preferably with a metallized inner surface, is provided for collecting the hair dust accumulating in the cutting head during shaving. The plate 12 is mounted on the housing 1 of insulating material at a certain spacing or distance from the knife block, in a readily detactable manner, and is insulated against the metallic portions of the cutting head.

In order to retain the hair dust on the plate 12 as reliably as possible and to prevent an uncontrolled escape of hair dust from the cutting head, means are provided in the apparatus for producing a high D.C. voltage. When this voltage is applied to the metallic cutting head as the ground electrode and the plate 12 as the counter-electrode, an electrical field between these two parts is produced; under the effect of this field, the hair dust is collected upon the plate and retained thereon.

Figure 2:
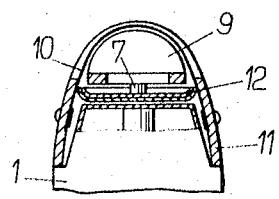
FIG. 2 is a cross-sectional view of the cutting head of the device of FIG. 1 taken along line II—II of FIG. 1.

In the embodiment of FIG. 1 and FIG. 2, the D.C. voltage is generated in the manner of pulses by a piezoelectrical means. For this purpose, a quartz platelet 13, metallized on both sides, is provided on one of the front faces of the knife block 9. This platelet periodically impactingly abuts a cam 14 mounted in an insulated manner on the cutting head frame 11 during the working motion of the cutter blade block. The cam 14 is in conductive connection with the metallized inner surface of the plate 12 by way of a contact spring 15. Voltage pulses are generated from the pressure periodically exerted upon the quartz lamina. The voltage pulses produce a correspondingly pulsing electrical field between the blade block and the cam 14 facing each other in the abutting direction, and thus between the electrodes connected with these elements, i.e., the plate 12 connected to the cam 14, and the frame 11 with the cutting foil 10 connected to the cutting blade block 9.

Figure 3:
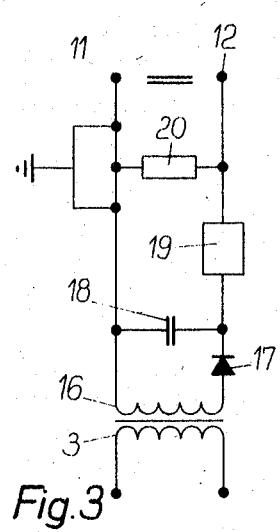
FIG. 3 is a diagrammatic showing of high voltage D.C. circuit for the electric field in the device of this invention with an interrupter means.

In the embodiment of FIG. 3, the D.C. voltage pulses are produced by means of an interrupter step up voltage circuit. For this purpose, an additional winding 16 is provided on the stator winding 3 of the oscillating armature motor 2; from this secondary coil, a low alternating voltage is derived. This voltage is applied, via a rectifier 17, after which a charging condenser 18 is connected, and via an interrupter such as a vibrator 19, to a coil 20 connected to the two electrodes 11 and 12. The interruption of the circuit can be effected with the motion of the drive or the cutting parts of the cutting head by way of a mechanical contact, by a contact-less circuit, such as a photocell, or with an inductive circuit.

Figure 4:
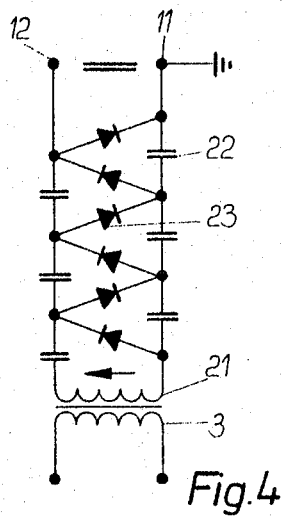
FIG. 4 is a digrammatic showing of the high voltage D.C. circuit for the electric field in the device of this invention with a cascade multiplier circuit.

In the embodiment of FIG. 4, the D.C. voltage is produced by means of a multiplier circuit or cascade circuit. For this purpose, there is likewise provided an additional winding 21 on one of the stator windings 3 of the oscillating armature motor 2; the alternating voltage derived therefrom is multiplied by a series of capacitor 22 and rectifier 23 pairs, and is fed as D.C. voltage to the two electrodes 11 and 12.

The distance of the plate 12 from the frame 11 or from the metallic parts of the cutting head connected with the frame such as the knife block 9 and the perforated cutting face plate 10 is dependent upon the strength of the electrical field.

Obviously, many modifications and variations of the invention as hereinabove set forth can be made without departing from the essence and scope thereof, and only such limitations should be applied as are indicated in the claims.

I claim:
1. An electric shaver with an electric field system for retaining hair dust in the cutting head comprising a metallic cutting head, a cutting blade means positioned therein, first and second spaced apart electrode means in the cutting head for generating an electric field, means connected with the electrodes for producing a high D.C. voltage between the electrodes, an electric motor drivingly connected to the cutting blade means, and the means for producing a high D.C. voltage comprises an additional winding on the winding of the electric motor power source connected to the first and second electrodes through a cascade multiplier circuit means with a plurality of capacitor-rectifier pairs.

2. An electric shaver with an electric field system for retaining hair dust in the cutting head comprising a metallic cutting head, a cutting blade means positioned therein, first and second spaced apart electrode means in the cutting head for generating an electric field, means connected with the electrodes for producing a high D.C. voltage between the electrodes, wherein the metallic cutting head is the first electrode and constitutes the ground electrode, and a plate insulated from the cutting head is the second electrode on which the hair dust collects, the plate being detachably mounted in the cutting head for easy removal and cleaning thereof.

3. An electric shaver with an electric field system for retaining hair dust in the cutting head comprising a metallic cutting head, a cutting blade means positioned therein, first and second spaced apart electrode means in the cutting head for generating an electric field, means connected with the electrodes for producing a high D.C. voltage between the electrodes, wherein the means for producing a high D.C. voltage between the electrodes is a piezoelectric crystal positioned for periodic abutment with another portion of the shaver.

4. The electric shaver of claim 3, wherein the cutting blade means is a reciprocating blade block, and a quartz lamina is attached to one of the front faces of the blade block in position for abutment with a cam attached to a frame of the cutting head, whereby electrical voltage pulses are generated when the quartz lamina abuts the cam.

References Cited
UNITED STATES PATENTS

| | | | |
|---|---|---|---|
| 2,977,677 | 4/1961 | Tice | 30—41.5 X |
| 3,045,345 | 7/1962 | Bermingham | 30—34.2 X |
| 3,274,682 | 9/1966 | Worthington | 30—34 |

FOREIGN PATENTS 1,818,343  3/1960  Germany.

MILTON O. HIRSHFIELD, Primary Examiner
D. F. DUGGAN, Assistant Examiner

U.S. Cl. X.R.
30—34, 43.92; 310—8.7, 29